(12) United States Patent
Ishikawa et al.

(10) Patent No.: US 8,820,354 B2
(45) Date of Patent: Sep. 2, 2014

(54) LIQUID FLOW RATE CONTROL VALVE

(75) Inventors: Seiichiro Ishikawa, Wako (JP); Yuki Shibahata, Wako (JP); Yasunari Kimura, Wako (JP); Masashi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 13/498,399

(22) PCT Filed: Sep. 30, 2010

(86) PCT No.: PCT/JP2010/067124
§ 371 (c)(1),
(2), (4) Date: Jun. 5, 2012

(87) PCT Pub. No.: WO2011/040552
PCT Pub. Date: Apr. 7, 2011

(65) Prior Publication Data
US 2012/0234400 A1     Sep. 20, 2012

(30) Foreign Application Priority Data
Oct. 1, 2009  (JP) ................................ 2009-229630

(51) Int. Cl.
| F16K 31/02 | (2006.01) |
| F16K 47/08 | (2006.01) |
| F16K 11/076 | (2006.01) |
| F15B 9/10 | (2006.01) |
| F16K 3/26 | (2006.01) |
| B60K 6/40 | (2007.10) |
| F16K 3/34 | (2006.01) |
| F02N 7/08 | (2006.01) |
| B60K 6/12 | (2006.01) |
| F15B 13/04 | (2006.01) |
| F15B 13/044 | (2006.01) |

(52) U.S. Cl.
CPC . *F16K 3/34* (2013.01); *F16K 3/262* (2013.01); *Y02T 10/6282* (2013.01); *F15B 13/0406* (2013.01); *Y02T 10/6208* (2013.01); *B60K 6/40* (2013.01); *F15B 13/0444* (2013.01); *F02N 7/08* (2013.01); *B60K 6/12* (2013.01)
USPC .............. 137/614.16; 137/625.3; 137/625.15; 251/129.12; 251/120

(58) Field of Classification Search
USPC ................... 137/625.3, 614.16, 625.15, 596, 137/624.13, 624.14; 251/129.11, 129.12, 251/120, 121; 91/375 R
See application file for complete search history.

(56) References Cited

U.S. PATENT DOCUMENTS

| 2,349,641 | A |   | 5/1944  | W.R. Tucker et al. |
| 2,395,979 | A | * | 3/1946  | Tucker et al. ............... 91/375 R |
| 3,018,622 | A | * | 1/1962  | Werts ......................... 60/39.281 |
| 3,069,025 | A |   | 12/1962 | R. Winkler et al. |
| 3,185,439 | A | * | 5/1965  | Inaba et al. ................... 415/150 |
| 3,213,881 | A | * | 10/1965 | Findlay et al. ................ 137/596 |
| 4,037,620 | A | * | 7/1977  | Johnson ........................ 137/596 |
| 4,109,683 | A |   | 8/1978  | Strache |
| 4,697,929 | A | * | 10/1987 | Muller ............................ 366/97 |
| 4,700,747 | A |   | 10/1987 | Wartelle |
| 4,779,512 | A | * | 10/1988 | Leonard ...................... 91/375 R |
| 4,793,133 | A | * | 12/1988 | White et al. ............... 60/39.281 |
| 4,800,924 | A | * | 1/1989  | Johnson ................... 137/625.23 |
| 4,964,612 | A | * | 10/1990 | Maggioni et al. ........ 251/129.09 |
| 4,977,816 | A | * | 12/1990 | Kuttruf ....................... 91/375 R |
| 5,242,150 | A | * | 9/1993  | Shiffler et al. ................ 251/209 |
| 5,467,800 | A |   | 11/1995 | Sallas |
| 5,522,416 | A |   | 6/1996  | Farrell et al. |
| 5,950,664 | A |   | 9/1999  | Battaglia |
| 5,954,093 | A | * | 9/1999  | Leonard ................... 137/625.23 |
| 5,971,604 | A |   | 10/1999 | Linga et al. |
| 6,594,992 | B1 |  | 7/2003  | Naito et al. |
| 6,769,451 | B2 | * | 8/2004  | Hjelsand .................. 137/625.23 |
| 6,826,988 | B2 | * | 12/2004 | Gass et al. ..................... 83/62.1 |
| 7,322,375 | B2 |  | 1/2008  | Goldfarb et al. |
| 2002/0079003 | A1 |  | 6/2002 | Scampini |
| 2008/0104955 | A1 |  | 5/2008 | Khalil |

FOREIGN PATENT DOCUMENTS

| | | |
|---|---|---|
| DE | 196 13 845 A1 | 10/1996 |
| DE | 101 10 764 A1 | 9/2002 |
| GB | 2 104 249 A | 3/1983 |
| JP | S58-75023 U | 5/1983 |
| JP | S63-501635 A | 6/1988 |
| JP | H04-238739 A | 8/1992 |
| JP | H06-29963 U | 4/1994 |
| JP | H08-104147 A | 4/1996 |
| JP | 2000-272890 A | 10/2000 |
| JP | 2001-027340 A | 1/2001 |
| JP | 2002-347671 A | 12/2002 |
| JP | 2006-037820 A | 2/2006 |
| JP | 2006-249990 A | 9/2006 |
| JP | 2007-224737 A | 9/2007 |
| JP | 2008-121697 A | 5/2008 |
| JP | 2008-247320 A | 10/2008 |
| JP | 2009-068553 A | 4/2009 |
| JP | 2009-126398 A | 6/2009 |
| JP | 2009-255611 A | 11/2009 |
| WO | 03/016761 A1 | 2/2003 |

\* cited by examiner

OTHER PUBLICATIONS

International Search Report issued in the International phase of corresponding, co-pending application, date of mailing Nov. 9, 2010.

*Primary Examiner* — John Rivell
*Assistant Examiner* — Kevin Barss
(74) *Attorney, Agent, or Firm* — Carrier Blackman & Associates, P.C.; Joseph P. Carrier; William D. Blackman (57) ABSTRACT

A liquid flow rate control valve is provided in which since a distributor (38) is rotated relative to a sleeve (37) by a first drive source (46) only through a predetermined angle, the total area of overlapping sections of a first opening (37*a*) of the sleeve (37) and the second opening (38*c*) of the distributor (38) changes, and a rotor (42) having a third opening (42*c* 42*d*) is rotated by a second drive source (47), it is possible to carry out PWM control of the liquid input from an input port (61*e*) and output it from an output port (61*f*). In this process, one end in an axis (L) direction of the rotor (42) disposed on an inside in a radial direction is coaxially connected to the second drive source (47), and one end in the axis (L) direction of the distributor (38) disposed on an outside in a radial direction is connected to the first drive source (46) via a gear train (66, 73, 70), and therefore, it is possible to individually rotate the distributor (38) and the rotor (42) while achieving a compact size by arranging the first and second drive sources (46, 47) in a concentrated manner at one end in the axis (L) direction of a liquid flow rate control valve (23).

4 Claims, 10 Drawing Sheets

LIQUID FLOW RATE CONTROL VALVE

CROSS-REFERENCE TO RELATED APPLICATIONS

The present application is the U.S. National Phase of PCT International Application PCT/JP2010/067124, filed Sep. 30, 2010, which, in turn, claimed priority based on Japanese patent application 2009-229630, filed Oct. 1, 2009. The subject matter of each of these priority documents, including specification, claims, and drawings, is incorporated by reference herein.

TECHNICAL FIELD

The present invention relates to a liquid flow rate control valve in which a cylindrical distributor and a cylindrical rotor are coaxially disposed on an axis in an interior of a cylindrical sleeve fixed to a valve housing, rotating the distributor only by a predetermined angle relative to the sleeve by a first drive source changes an area of an overlapping section in which a first opening formed in the sleeve and a second opening formed in the distributor overlap one another, and rotating the rotor at a predetermined speed relative to the sleeve and the distributor by a second drive source generates a liquid pressure at a predetermined duty ratio by a third opening, formed in the rotor, communicating with the first opening and the second opening when the third opening passes through the overlapping section.

BACKGROUND ART

A liquid flow rate control valve for carrying out PWM control of the flow rate of a liquid is known from Patent Document 1 below. With regard to this liquid flow rate control valve, a cylindrical valve plate 40 having left and right edge parts formed into a wave shape is disposed in the interior of an outer tube 10 having one input port 11 and two, that is, first and second, output ports 12 and 13 so that the cylindrical valve plate 40 can be rotated by a drive source, a control plate 50 having a plurality of first and second opening groups 41 and 42 is disposed between an outer peripheral face of the valve plate 40 and an inner peripheral face of the outer tube 10 so that the control plate 50 can be moved in the axial direction by a drive source, and a liquid supplied from the input port 11 of the outer tube 10 is made to pass through the first and second opening groups 41 and 42 of the control plate 50 and the left and right wave-shaped edge parts of the valve plate 40 and be discharged from the first and second output ports 12 and 13 of the outer tube 10. In this process, changing the period during which the first and second opening groups 41 and 42 of the control plate 50 are open and the period during which they are closed by the left and right wave-shaped edge parts of the rotating valve plate 40 in response to the axial position of the control plate 50 enables the duty ratio of liquid discharged from the first and second output ports 12 and 13 to be freely controlled, and changing the rotational speed of the valve plate 40 enables the duty frequency of liquid discharged from the first and second output ports 12 and 13 to be freely controlled.

Patent Document 1: Japanese Patent Application Laid-open No. 2009-68553

DISCLOSURE OF THE INVENTION

Problems to be Solved by the Invention

However, the above-mentioned conventional arrangement has the problem that since when one of the first and second output ports 12 and 13 separately disposed on opposite sides in the axial direction of the input port 11 is at high pressure the other is at low pressure, and when one is at low pressure the other is at high pressure, a large thrust in the axial direction acts each time on the valve plate 40, and a large capacity thrust bearing is necessary for supporting it.

Consideration could therefore be given to coaxially disposing a distributor and a rotor in the interior of a cylindrical sleeve, driving the distributor to rotate by a first drive source, and driving the rotor to rotate by a second drive source, thereby carrying out PWM control of the flow rate of a liquid without generating a large thrust in the axial direction. In such a case, if the first drive source is disposed at one end in the axial direction of the flow rate control valve and the second drive source is disposed at the other end in the axial direction of the flow rate control valve, there is the problem that the dimension in the axial direction of the flow rate control valve increases.

The present invention has been accomplished in light of the above-mentioned circumstances, and it is an object thereof to reduce the dimension in the axial direction of a liquid flow rate control valve that enables the flow rate of a liquid to be PWM-controlled at any duty ratio and any duty frequency.

Means for Solving the Problems

In order to attain the above object, according to the present invention, there is provided a liquid flow rate control valve in which a cylindrical distributor and a cylindrical rotor are coaxially disposed on an axis in an interior of a cylindrical sleeve fixed to a valve housing, rotating the distributor only by a predetermined angle relative to the sleeve by a first drive source changes an area of an overlapping section in which a first opening formed in the sleeve and a second opening formed in the distributor overlap one another, and rotating the rotor at a predetermined speed relative to the sleeve and the distributor by a second drive source generates a liquid pressure at a predetermined duty ratio by a third opening, formed in the rotor, communicating with the first opening and the second opening when the third opening passes through the overlapping section, wherein one end in the axis direction of that one of the distributor and the rotor which is disposed on an inside in a radial direction is coaxially connected to one of the first and second drive sources, and one end in the axis direction of that one of the distributor and the rotor which is disposed on an outside in the radial direction is connected to the other one of the first and second drive sources via a gear train.

First and second outlet openings 37a and 37b of an embodiment correspond to the first opening of the present invention, first and second communication hole groups 38c and 38d of the embodiment correspond to the second opening of the present invention, first and second first inlet openings 42c and 42d of the embodiment correspond to the third opening of the present invention, a first electric motor 46 of the embodiment corresponds to the first drive source of the present invention, and a second electric motor 47 of the embodiment corresponds to the second drive source of the present invention.

Effects of the Invention

In accordance with the above-mentioned aspect of the present invention, since the total area of overlapping sections of the first opening of the sleeve and the second opening of the distributor changes when the distributor is rotated relative to the sleeve by the first drive source only through a predetermined angle, when the rotor is rotated by the second drive source, the duty waveform is ON when the third opening of the rotor passes through the overlapping sections, the duty waveform is OFF when the third opening of the rotor is not passing through the overlapping sections, and it is thereby possible to carry out PWM control of the flow rate of the liquid. In this process, the duty ratio can be freely controlled by adjusting the position to which the distributor is rotated by the first drive source, and the duty frequency can be freely controlled by adjusting the speed at which the rotor is rotated by the second drive source. Furthermore, since a thrust load in the axial direction does not act on the distributor and the rotor, supporting the distributor and the rotor becomes easy, thereby enabling the cost and weight to be cut. Since one end in the axis direction of that one of the distributor and the rotor which is disposed on the inside in the radial direction is coaxially connected to one of the first and second drive sources, and one end in the axis direction of the one which is disposed on the outside in the radial direction is connected to the other one of the first and second drive sources via a gear train, it is possible to individually rotate the distributor and the rotor while achieving a compact size by arranging the first and second drive sources in a concentrated manner at one end in the axial direction of the liquid flow rate control valve.

EXPLANATION OF REFERENCE NUMERALS AND SYMBOLS

36 Valve housing
37 Sleeve
37a First outlet opening (first opening)
37b Second outlet opening (first opening)
38 Distributor
38c First communication hole group (second opening)
38d Second communication hole group (second opening)
42 Rotor
42c First inlet opening (third opening)
42d Second inlet opening (third opening)
46 First electric motor (first drive source)
47 Second electric motor (first drive source)
68 Driven gear (gear train)
70 Drive gear (gear train)
73 Idle gear (gear train)
L Axis

BEST MODE FOR CARRYING OUT THE INVENTION

A mode for carrying out the present invention is explained below by reference to FIG. 1 to FIG. 10.

Embodiment 1

Figure 1:
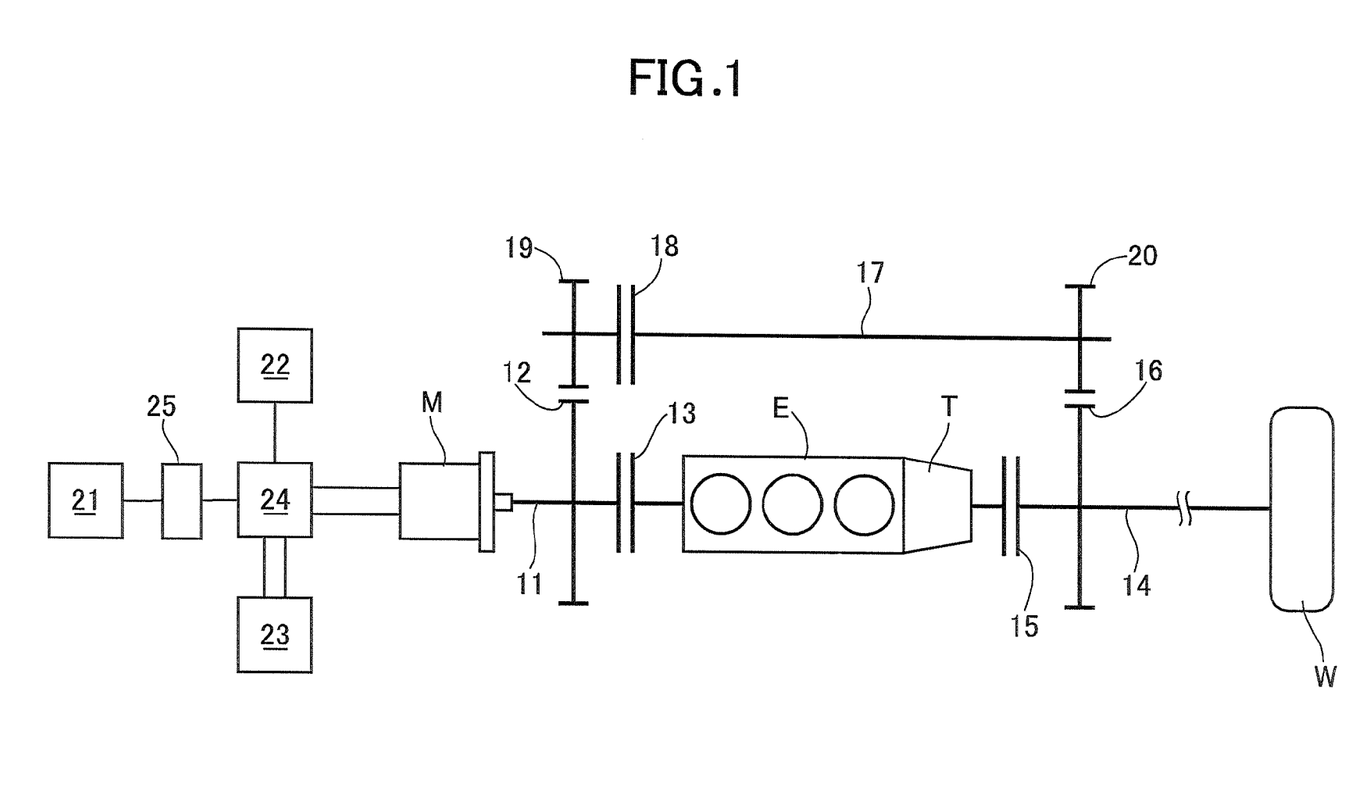
FIG. 1 is a diagram showing a driving force transmission system of a hydraulic hybrid vehicle to which the flow rate control valve of the present invention is applied. (first embodiment)

As shown in FIG. 1, a hydraulic hybrid vehicle includes a pump/motor M, an engine E, and a transmission T, which are connected in series. For example, a linking shaft 11 connecting the engine E and the pump/motor M, which is formed from a gear motor, is provided with a first gear 12 and a first clutch 13, and an output shaft 14 connecting the transmission T and a driven wheel W is provided with a second clutch 15 and a second gear 16. A bypass shaft 17 bypassing the engine E and the transmission T is provided with a third clutch 18, a third gear 19 meshing with the first gear 12, and a fourth gear 20 meshing with the second gear 16.

The pump/motor M, a tank 21, an accumulator 22, and a flow rate control valve 23 are connected via a switch control valve 24, and the pump/motor M is switched between a state in which it operates as a motor by liquid pressure stored under pressure in the accumulator 22 and a state in which it operates as a pump that is externally driven and stores pressure in the accumulator 22. A radiator 25 for cooling the liquid is provided between the tank 21 and the switch control valve 24. The radiator 25 may be provided between the accumulator 22 and the switch control valve 24.

Therefore, in a state in which the first clutch 13 is engaged and the second clutch 15 and the third clutch 18 are disengaged, the pump/motor M is operated as a motor by means of liquid pressure stored under pressure in the accumulator 22 to thus start the engine E, and the engine E is driven and the pump/motor M is operated as a pump to thus store pressure in the accumulator 22.

When the pump/motor M is driven by means of liquid pressure stored under pressure in the accumulator 22 in a state in which the third clutch 18 is engaged and the first clutch 13 and the second clutch 15 are disengaged, the driving force is transmitted to the driven wheel W via the path: linking shaft 11→first gear 12→third gear 19→third clutch 18→bypass shaft 17→fourth gear 20→second gear 16→output shaft 14, thereby starting or running the vehicle by means of the driving force of the pump/motor M. If the pump/motor M is subjected to regenerative braking in this state, the pump/motor M is operated as a pump by means of driving force transmitted back from the driven wheel W side to thus store pressure in the accumulator 22, thereby recovering kinetic energy of the vehicle as hydraulic energy.

In a state in which the second clutch 15 is engaged and the first clutch 13 and the third clutch 18 are disengaged, the driving force of the engine E is transmitted to the driven wheel W via the second clutch 15 and the output shaft 14, thereby starting or running the vehicle by means of the driving force of the engine E. If the first clutch 13 is further engaged in this state, the pump/motor M is operated as a motor to thus assist the driving force of the engine E with the driving force of the pump/motor M, and the pump/motor M is operated as a pump to thus store pressure in the accumulator 22.

The structure of the flow rate control valve 23 is now explained by reference to FIG. 2 to FIG. 6. The flow rate control valve 23 controls the flow rate of liquid supplied from the accumulator 22 to the pump/motor M when the pump/motor M is operated as a motor, and controls the flow rate of liquid supplied from the pump/motor M to the accumulator 22 when the pump/motor M is operated as a pump.

Figure 2:
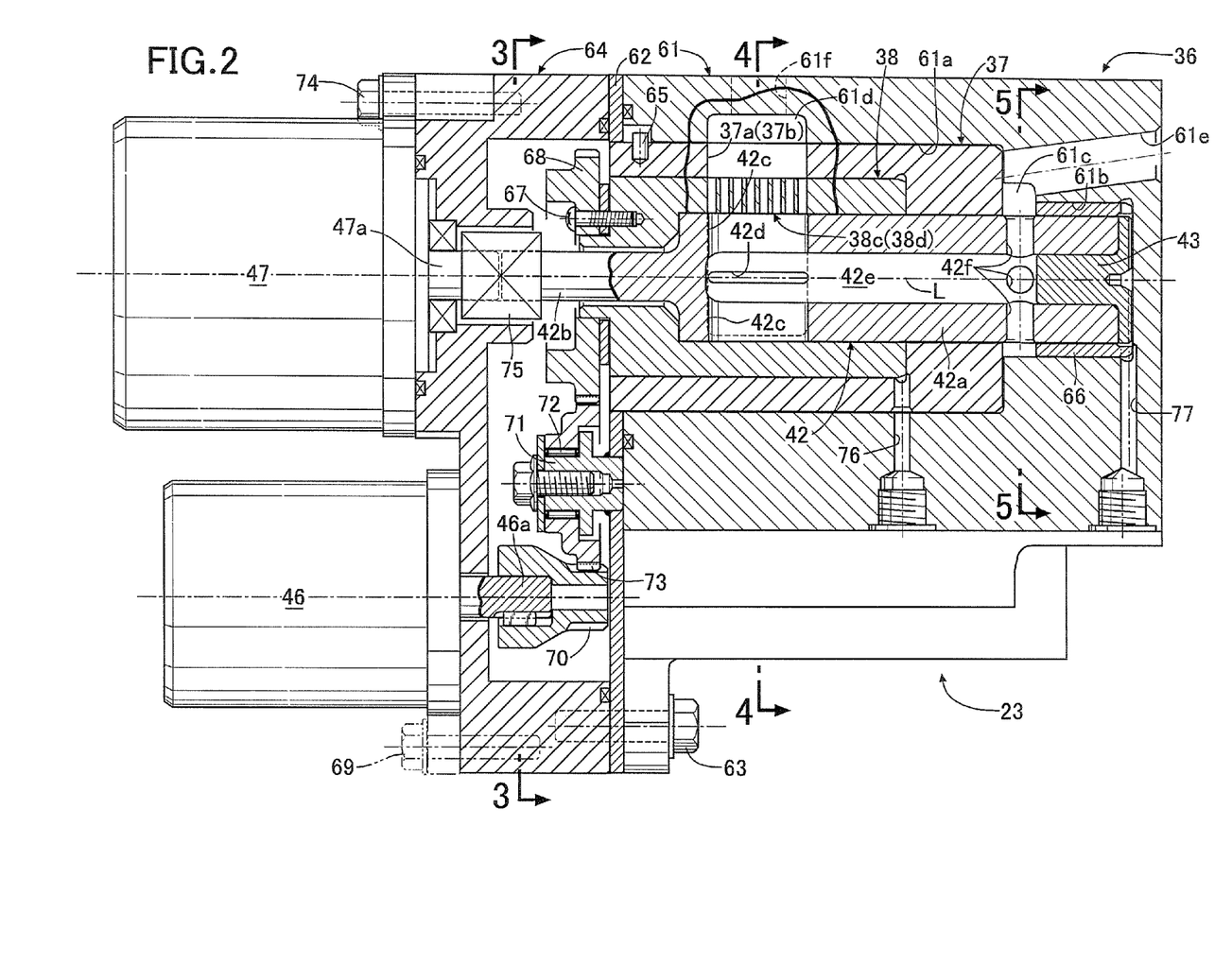
FIG. 2 is a sectional view of the flow rate control valve. (first embodiment)
Figure 3:
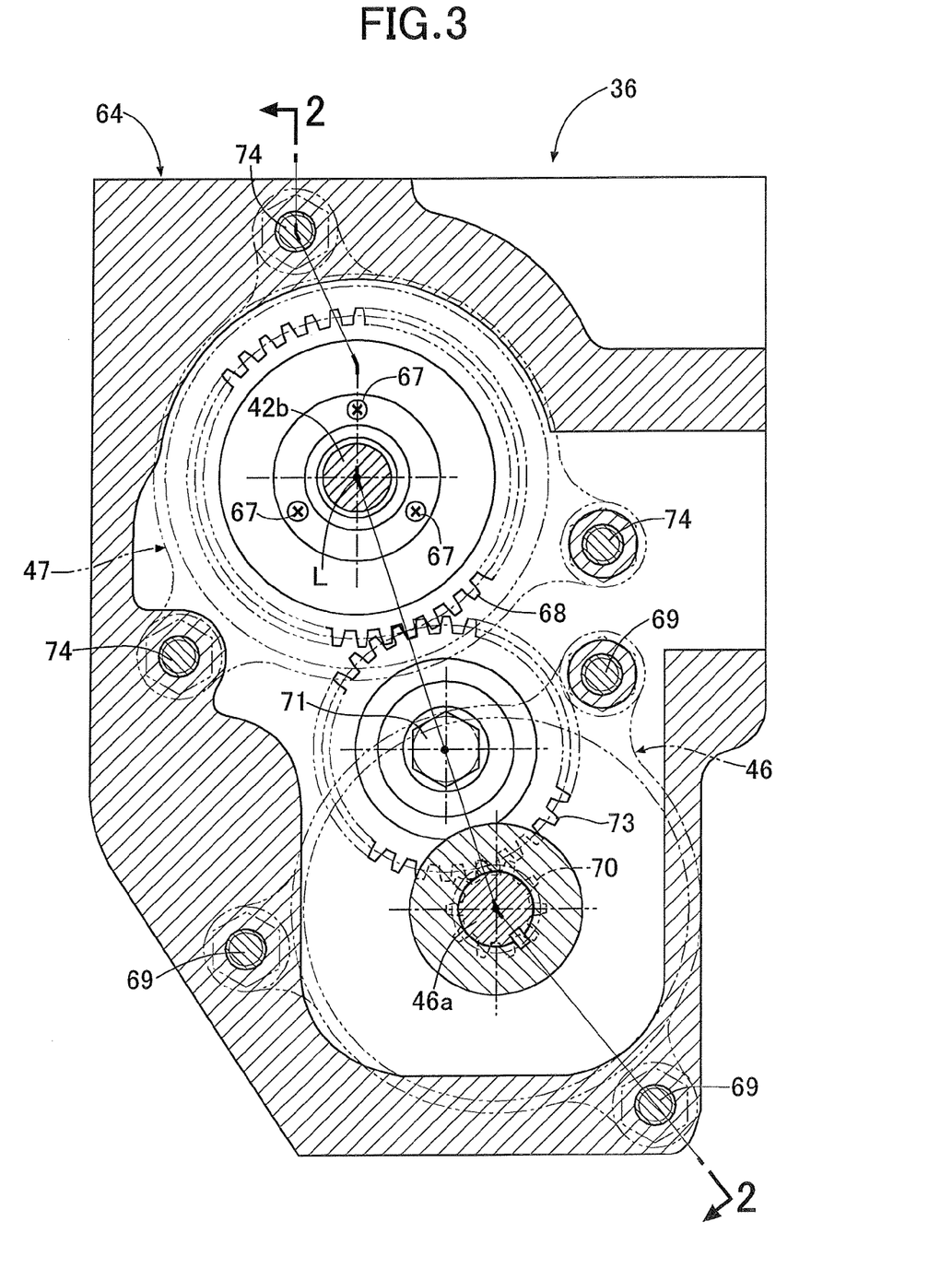
FIG. 3 is a sectional view along line 3-3 in FIG. 2. (first embodiment)

The flow rate control valve 23 includes a valve housing 36 formed from a main body housing 61 and an end housing 64 joined to the main body housing 61 by bolts 63 with a partition wall plate 62 sandwiched therebetween. A circular cross-section large diameter hole 61a and a circular cross-section small diameter hole 61b are coaxially formed on an axis L of the main body housing 61, an arc-shaped input liquid chamber 61c is formed so as to surround part of the small diameter hole 61b, and an arc-shaped output liquid chamber 61d is formed so as to surround part of the large diameter hole 61a. An input port 61e communicating with the input liquid chamber 61c opens on one end face of the main body housing 61, and an output port 61f communicating with the output liquid chamber 61d opens on an outer peripheral face of the main body housing 61.

Formed, so as to face the output liquid chamber 61d, in a cylindrical sleeve 37 fitted into the large diameter hole 61a of the main body housing 61 and stopped from rotating by a pin 65 are first and second outlet openings 37a and 37b each having a central angle of 90° with the axis L as a center. The first and second outlet openings 37a and 37b have a rectangular shape when the sleeve 37 is in a developed state, have phases thereof displaced from each other by 180°, and are disposed at positions so as to overlap one another in the axis L direction.

Formed in a distributor 38 relatively rotatably fitted into the inner periphery of the sleeve 37 are first and second communication hole groups 38c and 38d that can overlap with the first and second outlet openings 37a and 37b of the sleeve 37. The first and second communication hole groups 38c and 38d are formed from a large number of circular communication holes 38e disposed in a staggered manner, have a central angle of 90° with the axis L as a center, have phases displaced from each other by 180°, and are disposed at positions so as to overlap one another in the axis L direction. The outlines of the first and second communication hole groups 38c and 38d have the same shape as the first and second outlet openings 37a and 37b and can completely overlap the first and second outlet openings 37a and 37b.

A rotor 42 includes a cylindrical portion 42a and a shaft portion 42b; the cylindrical portion 42a, which has an open end closed by a plug 43, is relatively rotatably fitted into the inner periphery of the distributor 38, and the shaft portion 42b extends through the partition wall plate 62 and extends to the interior of the end housing 64. The extremity of the cylindrical portion 42a of the rotor 42 is rotatably supported on the inner periphery of the small diameter hole 61b of the main body housing 61 via a bearing metal 66. Formed in the cylindrical portion 42a of the rotor 42 are a pair of first inlet openings 42c and 42c with a phase difference of 180°, the first inlet openings 42c and 42c being capable of communicating with the first and second communication hole groups 38c and 38d of the distributor 38, and in addition a pair of second inlet openings 42d and 42d with a phase difference of 180°, the pair of second inlet openings 42d and 42d having phases displaced by 90° relative to the pair of first inlet openings 42c and 42c. The total of four first and second inlet openings 42c and 42c; 42d and 42d, which are aligned in the axis L direction, are formed into a slit shape, the width thereof in the axis L direction coinciding with the width in the axis L direction of the first and second outlet openings 37a and 37b and the first and second communication hole groups 38c and 38d. An interior space 42e of the rotor 42 communicating with the first and second inlet openings 42c and 42c; 42d and 42d communicates with the input liquid chamber 61c of the main body housing 61 via liquid holes 42f.

A driven gear 68 fixed by bolts 67 to an end part of the distributor 38 facing the interior of the end housing 64 and a drive gear 70 provided on a rotary shaft 46a of a first electric motor 46 fixed to the end housing 64 by bolts 69 mesh with an idle gear 73 rotatably supported via a needle bearing 72 on an idle shaft 71 fixed to the partition wall plate 62. The number of teeth of the drive gear 70 is smaller than the number of teeth of the driven gear 68, rotation of the first electric motor 46 is reduced in speed and transmitted to the distributor 38, and the distributor 38 is rotated over an angular range of 90°.

A rotary shaft 47a of a second electric motor 47 fixed to the end housing 64 via bolts 74 is coaxially joined to the shaft portion 42a of the rotor 42 via a coupling 75. Therefore, the rotor 42 can be rotated at any speed by the second electric motor 47.

In FIG. 2, the right end in the figure of the distributor 38 communicates with the atmosphere via a pressure equilibrium passage 76 extending through the main body housing 61 and the sleeve 37; balancing with the pressure at the left end in the figure of the distributor 38, which is at atmospheric pressure, prevents an offset load in the axis L direction from being imposed on the distributor 38. Similarly, the right end in the figure of the rotor 42 communicates with the atmosphere via a pressure equilibrium passage 77 extending through the main body housing 61; balancing with the pressure at the left end in the figure of the rotor 42, which is at atmospheric pressure, prevents an offset load in the axis L direction from being imposed on the rotor 42.

The operation of the flow rate control valve 23 having the above-mentioned arrangement is now explained.

Figure 4:
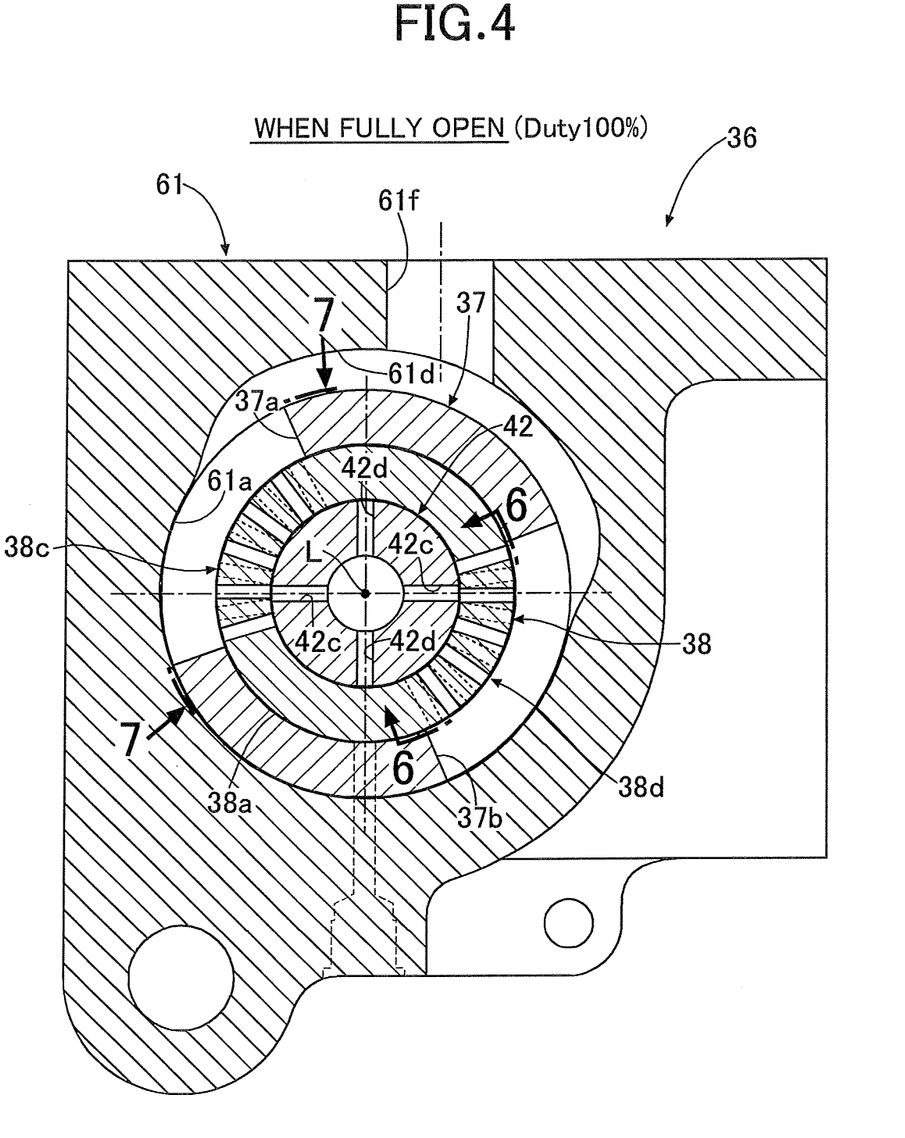
FIG. 4 is a sectional view along line 4-4 in FIG. 2. (first embodiment)
Figure 5:
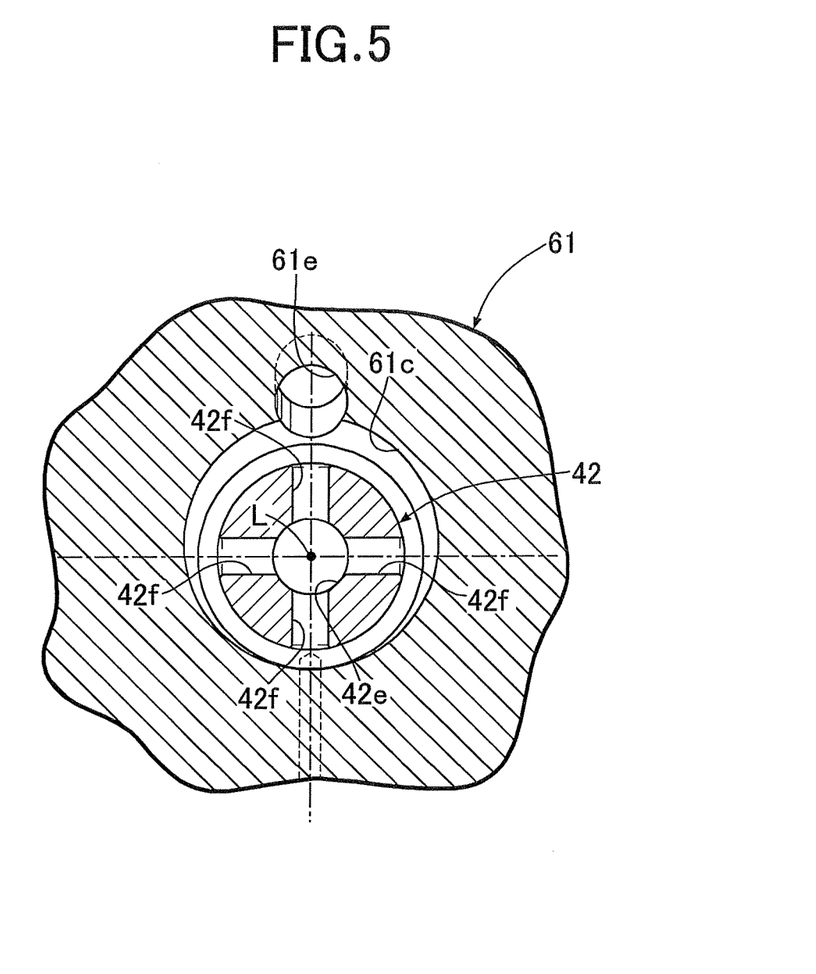
FIG. 5 is a sectional view along line 5-5 in FIG. 2. (first embodiment)
Figure 6:
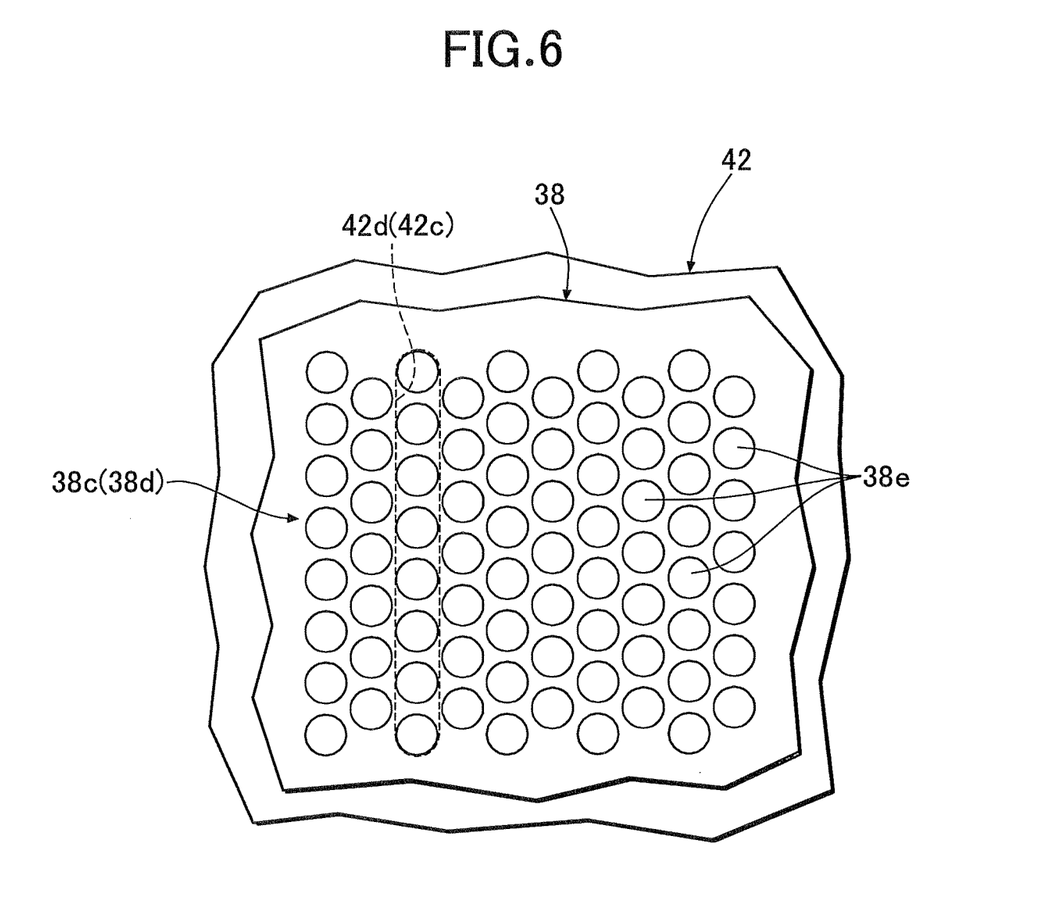
FIG. 6 is a sectional view along line 6-6 in FIG. 4. (first embodiment)
Figure 7:
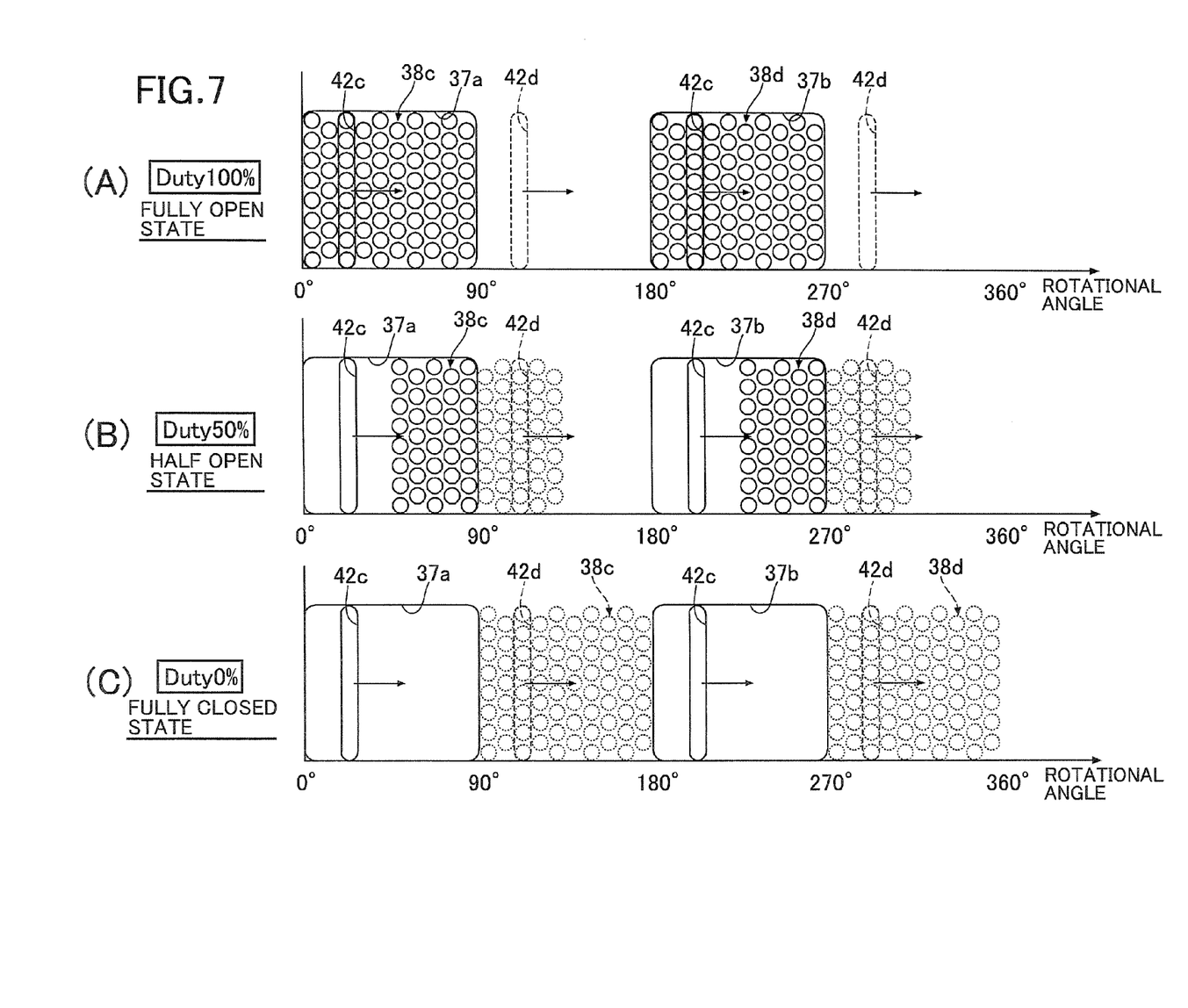
FIG. 7 is a view from arrowed line 7-7 in FIG. 4. (first embodiment)
Figure 8:
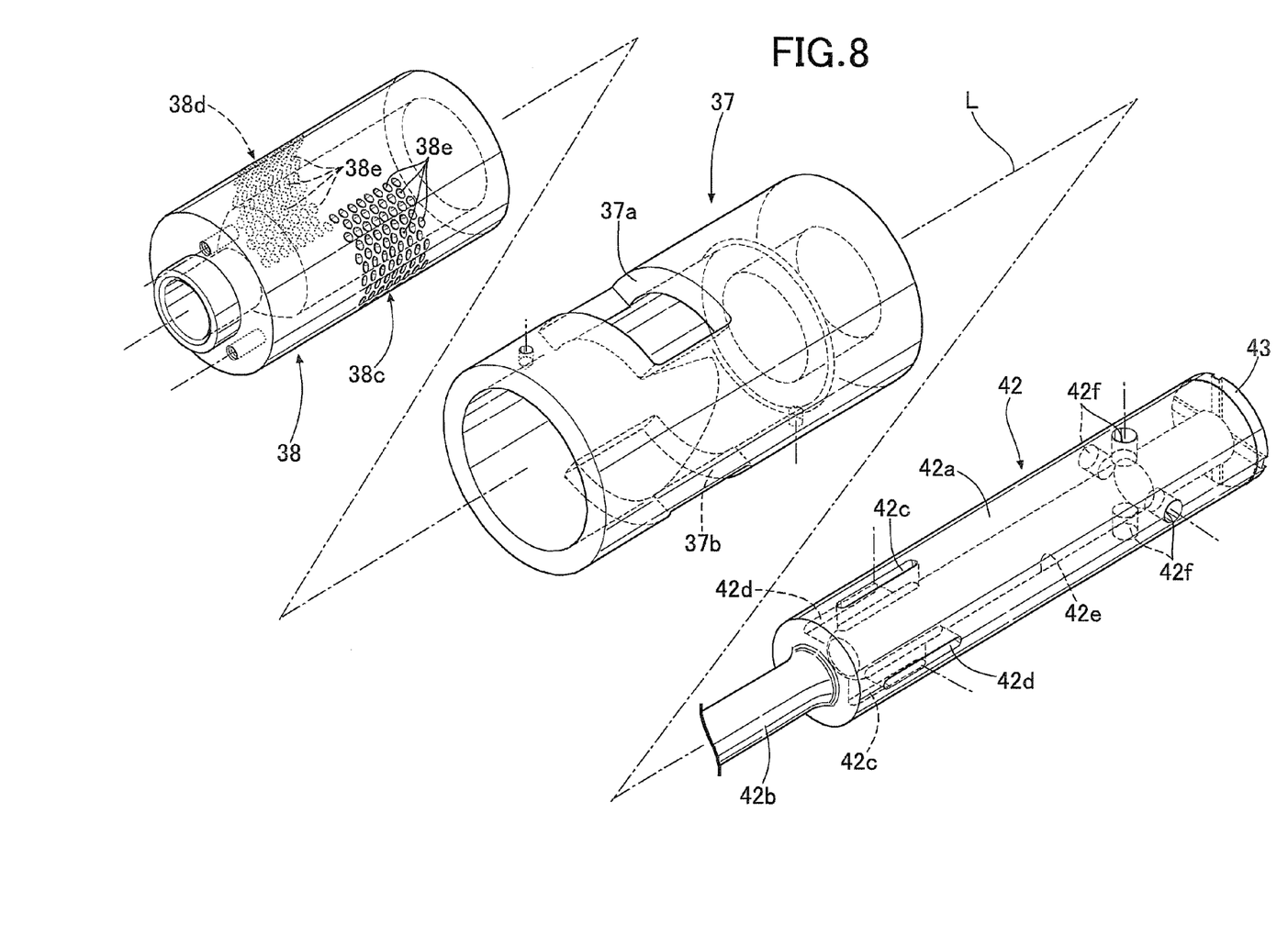
FIG. 8 is an exploded perspective view of a sleeve, a distributor, and a rotor. (first embodiment)

FIG. 7 (A) to FIG. 7 (C) are views developed along line 7-7 in FIG. 4, and show states in which the sleeve 37 fixed to the valve housing 36, the distributor 38 rotated by the first electric motor 46 relative to the sleeve 37 over a range of 0° to 90°, and the rotor 42 rotated at a variable speed by the second electric motor 47 relative to the sleeve 37 and the distributor 38 are developed in the circumferential direction through 360°.

FIG. 7 (A) corresponds to a state with a duty ratio of 100%; the first and second outlet openings 37a and 37b of the sleeve 37 open over a range of 0° to 90° and a range of 180° to 270° within the central angle of 360° of the sleeve 37, and since the first and second communication hole groups 38c and 38d of the distributor 38 overlap the first and second outlet openings 37a and 37b of the sleeve 37 throughout the region, the effective open range of the first and second outlet openings 37a and 37b of the sleeve 37 is 0° to 90° and 180° to 270°. When the rotor 42 is rotated by means of the second electric motor 47 relative to the sleeve 37 and the distributor 38, the four first and second inlet openings 42c and 42c; 42d and 42d formed in the rotor 42 at intervals of 90° move from the left side to the right side in the figure. FIG. 7 (A) shows a state in which the two first inlet openings 42c and 42c overlap the effective open range and the two second inlet openings 42d and 42d do not overlap the effective open range.

When the pump/motor M operates as a motor, the input port 61e of the main body housing 61 is connected to the accumulator 22, and the output port 61f of the main body housing 61 is connected to the tank 21. Therefore, high pressure liquid of the accumulator 22 is supplied to the interior space 42e of the rotor 42 via the path: input port 61e of main body housing 61→input liquid chamber 61c of main body housing 61→liquid hole 42f of rotor 42. When the first and second inlet openings 42c and 42c; 42d and 42d facing the interior space 42e of the rotor 42 overlap the effective open range of the first and second communication hole groups 38c and 38d of the distributor 38 and the first and second outlet openings 37a and 37b of the sleeve 37, liquid of the interior space 42e of the distributor 38 is returned to the tank 21 via the path: first and second inlet openings 42c and 42c; 42d and 42d of rotor 42→first and second communication hole groups 38c and 38d of distributor 38→first and second outlet openings 37a and 37b of sleeve 37→output liquid chamber 61d of main body housing 61→output port 61f of main body housing 61, and the pump/motor M operates as a motor.

In a state in which the duty ratio is 100%, a range of 0° to 90° and a range of 180° to 270° of the sleeve 37 are the two effective open ranges, and the duty waveform generated by the two first inlet openings 42c and 42c of the rotor 42 is ON in a range of 0° to 90° and a range of 180° to 270° within the rotational angle of 360° of the rotor 42. On the other hand, the phases of the two second inlet openings 42d and 42d of the rotor 42 are displaced by 90° relative to the phases of the two first inlet openings 42c and 42c, and the duty waveform generated by the two second inlet openings 42d and 42d of the rotor 42 is therefore ON in a range of 90° to 180° and a range of 270° to 360° within the rotational angle of 360° of the rotor 42.

Therefore, superimposing the duty waveform generated by the two first inlet openings 42c and 42c and the duty waveform generated by the two second inlet openings 42d and 42d gives a waveform with a duty ratio of 100%.

FIG. 7 (B) is a diagram corresponding to a state with a duty ratio of 50%; since a range of 0° to 45° and a range of 180° to 225° of the sleeve 42 are the two effective open ranges, the duty waveform generated by the two first communication holes 42c and 42c of the rotor 42 is ON in a range of 0° to 45° and in a range of 180° to 225° within the rotational angle of 360° of the rotor 42. On the other hand, the phase of the two second inlet openings 42d and 42d of the rotor 42 is displaced relative to the phase of the two first inlet openings 42c and 42c by 90°, and the duty waveform generated by the two second inlet openings 42d and 42d of the rotor 42 is therefore ON in a range of 90° to 135° and in a range of 270° to 315° within the rotational angle of 360° of the rotor 42.

Therefore, superimposing the duty waveform generated by the two first inlet openings 42c and 42c and the duty waveform generated by the two second inlet openings 42d and 42d gives a waveform having a duty ratio of 50%.

As shown in FIG. 7 (C), in a state in which the first and second communication hole groups 38c and 38d do not overlap the first and second outlet openings 37a and 37b at all, that is, in a state in which there is no effective open range, regardless of the phases of the first and second inlet openings 42c and 42c; 42d and 42d of the rotor 42, the first and second communication hole groups 38c and 38d and the first and second outlet openings 37a and 37b do not communicate with each other, and the duty ratio is 0%.

In this way, the flow rate control valve 23 outputs a duty waveform four times per rotation of the rotor 42. Therefore, when the speed at which the rotor 42 is rotated by means of the second electric motor 47 is defined as N, the frequency of the duty waveform outputted by the flow rate control valve 23 is 4N, and it is possible to obtain a high duty frequency while keeping the rotational speed of the second electric motor 47 low.

Furthermore, since the first and second communication hole groups 38c and 38d of the distributor 38 are disposed at the same positions in the axis L direction and are disposed axially symmetrically with an interval of 180°, even if a load from liquid passing through the first and second communication hole groups 38c and 38d acts on the distributor 38, the load does not result in bending deformation of the distributor 38 or tilting of the distributor 38. Therefore, it is possible to prevent galling from occurring between the distributor 38 and the sleeve 37 and rotor 42, thereby enabling the driving forces of the first and second electric motors 46 and 47 to be minimized.

As described above, in accordance with the present embodiment, since the flow rate of liquid supplied from the accumulator 22 to the pump/motor M is duty controlled by the flow rate control valve 23, compared with a case in which the flow rate of liquid is controlled by a throttle valve, heat loss due to pressure loss can be reduced to thus give high efficiency. In this process, selecting an optimum duty frequency by adjusting the rotational speed of the rotor 42 enables higher efficiency to be obtained. Moreover, since the liquid pressure of the input liquid chamber 61c and the output liquid chamber 61d does not generate a thrust load on the distributor 38 and the rotor 42 in the axis L direction, it becomes unnecessary to support the distributor 38 and the rotor 42 so as to withstand such a thrust load, and it is possible to simplify the structure and cut the weight and cost.

The structure of a liquid pressure control circuit for switching the operation of the pump/motor M between a motor and a pump is now explained.

Figure 9:
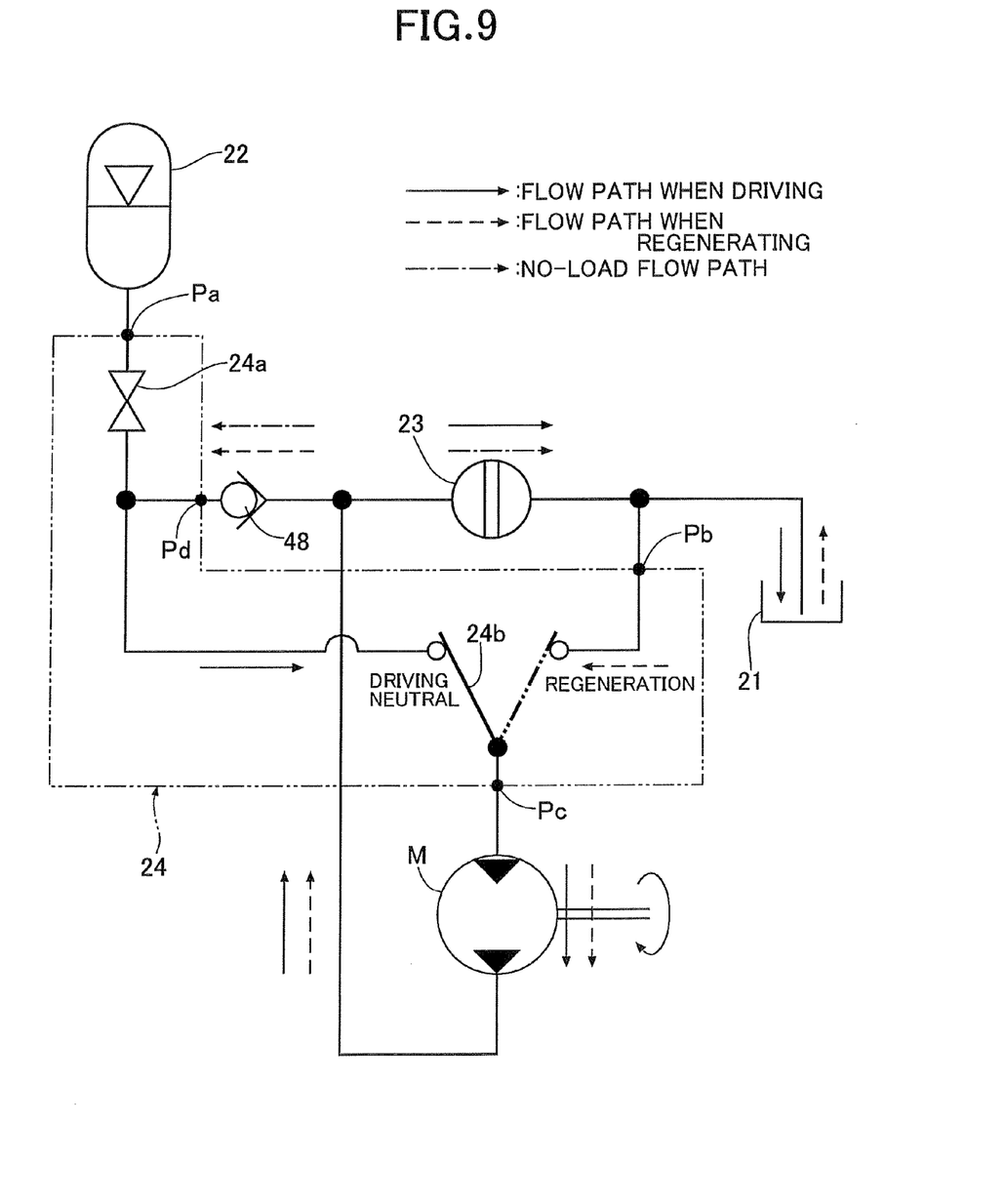
FIG. 9 is a diagram showing an equivalent circuit of a drive circuit for a pump/motor. (first embodiment)

FIG. 9 shows an equivalent circuit of the liquid pressure control circuit, the switch control valve 24 including four ports Pa, Pb, Pc, and Pd, a cut-off valve 24a, and a switch valve 24b. The port Pa is connected to the accumulator 22, the port Pb is connected to the tank 21, the port Pc is connected to the pump/motor M, and the port Pd is connected to the downstream side of a check valve 48. The cut-off valve 24a is disposed between the port Pa and the port Pd, and the port Pc is selectively connected to the ports Pa and Pd or the port Pb via the switch valve 24b. The upstream side of the check valve 48 is connected to the pump/motor M and is also connected to the port Pb and the tank 21 via the flow rate control valve 23.

Figure 10:
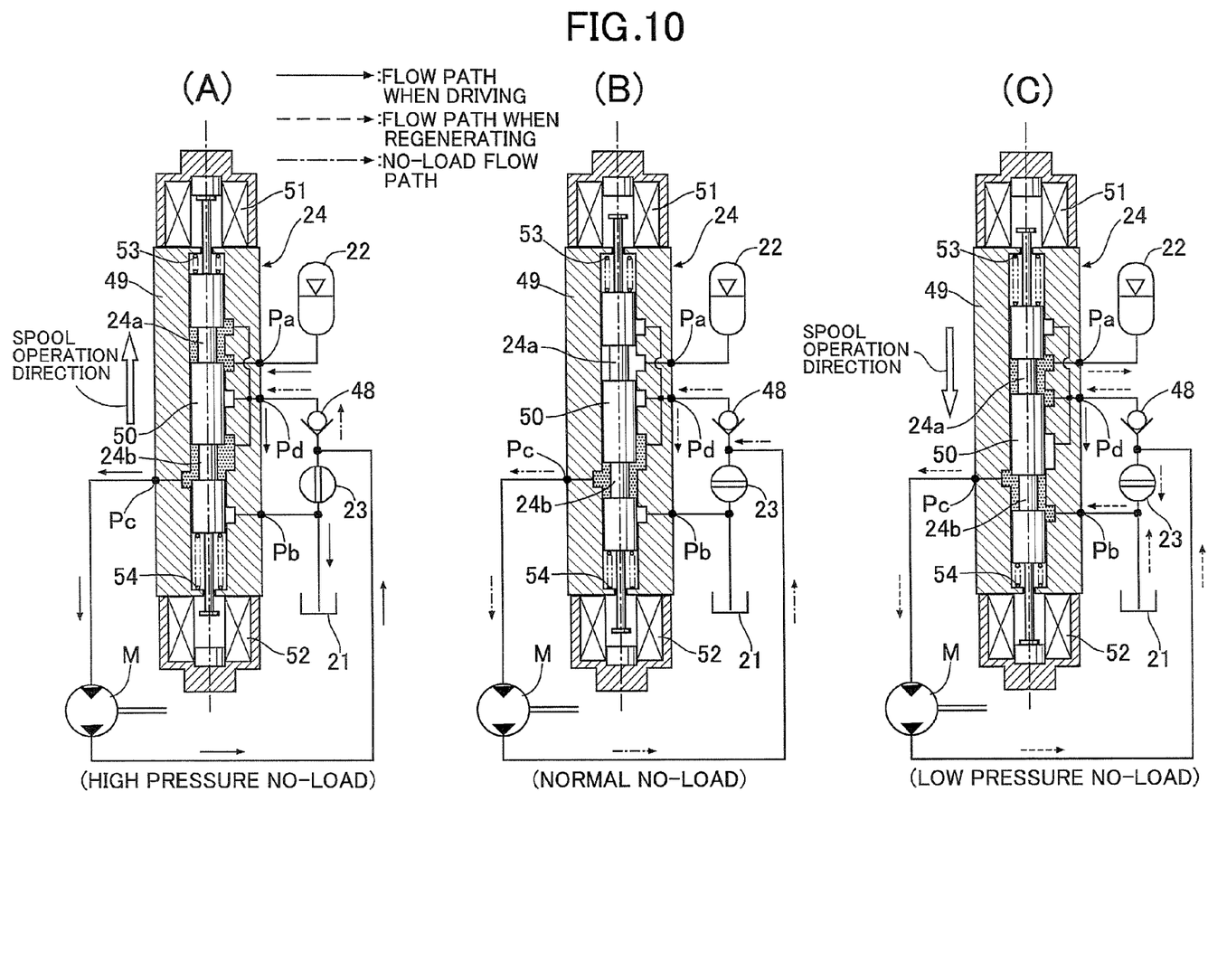
FIG. 10 is a diagram showing a drive circuit for the pump/motor. (first embodiment)

FIG. 10 is a liquid pressure circuit embodying the switch control valve 24 of the equivalent circuit of FIG. 9; the switch control valve 24 is formed from a spool 50 slidably fitted into a valve housing 49, two solenoids 51 and 52 driving the spool 50, and return springs 53 and 54 urging the spool 50 to a neutral position.

As shown in FIG. 9 and FIG. 10 (A), when the pump/motor M is operated as a motor, the solenoid 51 is energized and the solenoid 52 is de-energized to thus move the spool 50 upward in the figure, the cut-off valve 24a is opened, and the switch valve 24b is switched toward the drive/neutral side. As a result, when the duty ratio of the flow rate control valve 23 is 100%, the liquid of the accumulator 22 flows via the path: port Pa→cut-off valve 24a→switch valve 24b→port Pc→pump/motor M→flow rate control valve 23→tank 21, thus enabling the pump/motor M to be driven.

When the duty ratio of the flow rate control valve 23 is 0%, liquid that has passed through the pump/motor M is blocked by the flow rate control valve 23 and cannot flow into the tank 21, and the liquid of the accumulator 22 therefore circulates in a closed no-load circuit via the path: port Pa→cut-off valve 24a→switch valve 24b→port Pc→pump/motor M→check valve 48→port Pd→switch valve 24b. In this process, since the liquid that is flowing in the no-load circuit is high pressure liquid of the accumulator 22 (high pressure no-load), it is possible to suppress effectively the occurrence of cavitation.

When the duty ratio of the flow rate control valve 23 is larger than 0% and smaller than 100%, during a duty ON period when the flow rate control valve 23 is open the pump/motor M is in a load state in which a driving force is generated, and during a duty OFF period when the flow rate control valve 23 is closed the pump/motor M is in a no-load state in which no driving force is generated.

As shown in FIG. 9 and FIG. 10 (B), when the pump/motor M is operated as neither a motor nor a pump (neutral state), both the solenoid 51 and the solenoid 52 are de-energized to thus put the spool 50 into a neutral position, the cut-off valve 24*a* is closed, and the switch valve 24*b* is switched toward the drive/neutral side. As a result, the closed no-load circuit: pump/motor M→check valve 48→port Pd→switch valve 24*b*→port Pc→pump/motor M is formed, and the pump/motor M rotates without load.

As shown in FIG. 9 and FIG. 10 (C), when the pump/motor M is operated as a pump, the solenoid 51 is de-energized and the solenoid 52 is energized to thus move the spool 50 downward in the figure, the cut-off valve 24*a* is opened, and the switch valve 24*b* is switched toward the regeneration side. As a result, when the duty ratio of the flow rate control valve 23 is 0%, since liquid pressurized by the pump/motor M cannot pass through the flow rate control valve 23, the liquid of the tank 21 flows via the path: port Pb→switch valve 24*b*→port Pc→pump/motor M→check valve 48→port Pd→cut-off valve 24*a*→port Pa→accumulator 22, and pressure can thereby be stored in the accumulator 22.

When the duty ratio of the flow rate control valve 23 is 100%, since liquid that has passed through the pump/motor M can pass through the flow rate control valve 23 without load, the liquid of the tank 21 circulates in a closed no-load circuit via the path: port Pb→switch valve 24*b*→port Pc→pump/motor M→flow rate control valve 23→port Pb. In this process, since the liquid that is flowing in the no-load circuit is low pressure liquid of the tank 21 (low pressure no-load), it is possible to prevent the liquid from leaking and to reduce the operating resistance of the pump/motor M and the flow rate control valve 23.

When the duty ratio of the flow rate control valve 23 is larger than 0% and smaller than 100%, during a duty OFF period when the flow rate control valve 23 is closed the pump/motor M is in a load state in which a liquid pressure is generated, and during a duty ON period when the flow rate control valve 23 is open the pump/motor M is in a no-load state in which no liquid pressure is generated.

In the present embodiment, since the pump/motor M is used as a drive source for a hydraulic hybrid vehicle, although the rotational direction is the same both when the pump/motor M operates as a motor (when driving) and when it operates as a pump (when regeneratively braking), reversing the connective relationship between the tank 21 and the accumulator 22 by means of the switch control valve 24 enables driving and regenerative braking of the pump/motor M to be carried out without problem while requiring no mechanism for reversing the rotational direction of the pump/motor M. Furthermore, not only is it possible to carry out switching between driving, regeneration, and neutral with respect to the pump/motor M by means of one switch control valve 24, but it is also possible to automatically form a high pressure no-load circuit when the pump/motor M is driving and to automatically form a low pressure no-load circuit when the pump/motor M is regeneratively braking.

A mode for carrying out the present invention is explained above, but the present invention may be modified in a variety of ways as long as the modifications do not depart from the spirit and scope thereof.

For example, even if the direction of flow of liquid is reversed, the flow rate control valve 23 of each embodiment can normally exhibit a function of carrying out PWM control of liquid flow rate at any duty ratio and any duty frequency.

That is, in each embodiment, liquid flows in from the input port 61*e* side and flows out from the output port 61*f* side, but the functions of the ports may be swapped so that liquid flows in from the output port 61*f* side and flows out from the input port 61*e* side. Therefore, in the embodiment, the input port and the inlet opening include ones having the function of liquid flowing out and the output port and the outlet opening include ones having the function of liquid flowing in.

Furthermore, in the embodiment, the flow rate control valve 23 of the present invention is applied to a hydraulic hybrid vehicle, but the flow rate control valve 23 of the present invention may be used in any application. Applications to an automobile, etc. include those below.

(1) Flow rate control valve applied to variable flow rate oil pump
(2) Flow rate control valve applied to variable flow rate water pump
(3) Flow rate control valve applied to engine injector
(4) Flow rate control valve applied to air conditioner coolant pump
(5) Flow rate control valve applied to engine throttle valve
(6) Flow rate control valve applied to turbo boost pressure control Furthermore, the first and second electric motors 46 and 47 may be replaced by any drive source other than an electric motor.

Furthermore, in the embodiment, the sleeve 37, the distributor 38, and the rotor 42 are disposed in sequence from the outside to the inside in the radial direction of the flow rate control valve 23, but the positional relationship between the distributor 38 and the rotor 42 may be switched over, and the sleeve 37, the rotor 42, and the distributor 38 may be disposed in sequence from the outside to the inside in the radial direction of the flow rate control valve 23.

The invention claimed is:

1. A liquid flow rate control valve comprising:
a cylindrical distributor and a cylindrical rotor which are coaxially disposed in an interior of a cylindrical sleeve fixed to a valve housing, wherein the flow rate control valve is configured such that
rotation of the distributor only by a predetermined angle relative to the sleeve by a first drive source changes an area of an overlapping section in which a first opening formed in the sleeve and a second opening formed in the distributor overlap one another, and
rotation of the rotor at a predetermined speed relative to the sleeve and the distributor by a second drive source generates a liquid pressure at a predetermined duty ratio by a third opening, formed in the rotor and communicating with the first opening and the second opening when the third opening passes through the overlapping section,
and wherein one end in the axis direction of that one of the distributor and the rotor which is disposed on an inside in a radial direction is coaxially connected to one of the first and second drive sources, and one end in the axis direction of that one of the distributor and the rotor which is disposed on an outside in the radial direction is connected to the other one of the first and second drive sources via a gear train.

2. The liquid flow rate control valve of claim 1, wherein the first opening in the sleeve has a limited central angle of 90 degrees with respect to an axis of the sleeve.

3. A liquid flow rate control valve comprising:
a housing having an input port and an output port formed therein;
a cylindrical sleeve fixedly disposed in the housing, the cylindrical sleeve having a cylindrical bore formed therein and comprising a wall portion having a first outlet opening formed in a first side portion thereof and a second outlet opening formed in a second side portion thereof substantially opposite the first outlet opening;

a cylindrical distributor having a cylindrical bore formed therein and rotatably fitted into the cylindrical bore of the sleeve so as to be coaxial therewith, the distributor having first and second communication hole groups formed in opposed sides thereof that can selectively overlap with the first and second outlet openings of the sleeve upon rotary movement of the distributor;

a first motor operatively connected to the distributor for selectively causing rotation thereof;

a cylindrical rotor rotatably fitted in the hollow bore of the distributor so as to be coaxial therewith, said rotor having an interior fluid channel formed therein and having an inlet opening formed therein for selectively communicating with the inlet port, the rotor further having a plurality of outlet slots formed therein which can selectively overlap with the communication hole groups of the distributor upon rotary movement of the distributor and/or the rotor;

a second motor operatively connected to the rotor for selectively causing rotation thereof;

wherein the flow rate control valve is configured such that rotation of the distributor by a predetermined angle relative to the sleeve by a first drive source changes an area of an overlapping section in which one of said outlet openings of the sleeve and a portion of a communication hole group of the distributor overlap one another, and rotation of the rotor at a predetermined speed relative to the sleeve and the distributor by the second motor is operable to generate a liquid pressure at a predetermined duty ratio by one of said outlet slots formed in the rotor and communicating with said one of said outlet openings of the sleeve and a portion of a communication hole group of the distributor when the outlet slot is selectively aligned with the overlapping section.

4. The liquid flow rate control valve of claim 3, wherein the first outlet opening in the sleeve has a limited central angle of 90 degrees with respect to an axis of the sleeve.

* * * * *